Feb. 8, 1966  T. J. CEBULA  3,233,627
IRRIGATION HOSE HOLDER
Filed Oct. 9, 1963  2 Sheets-Sheet 1
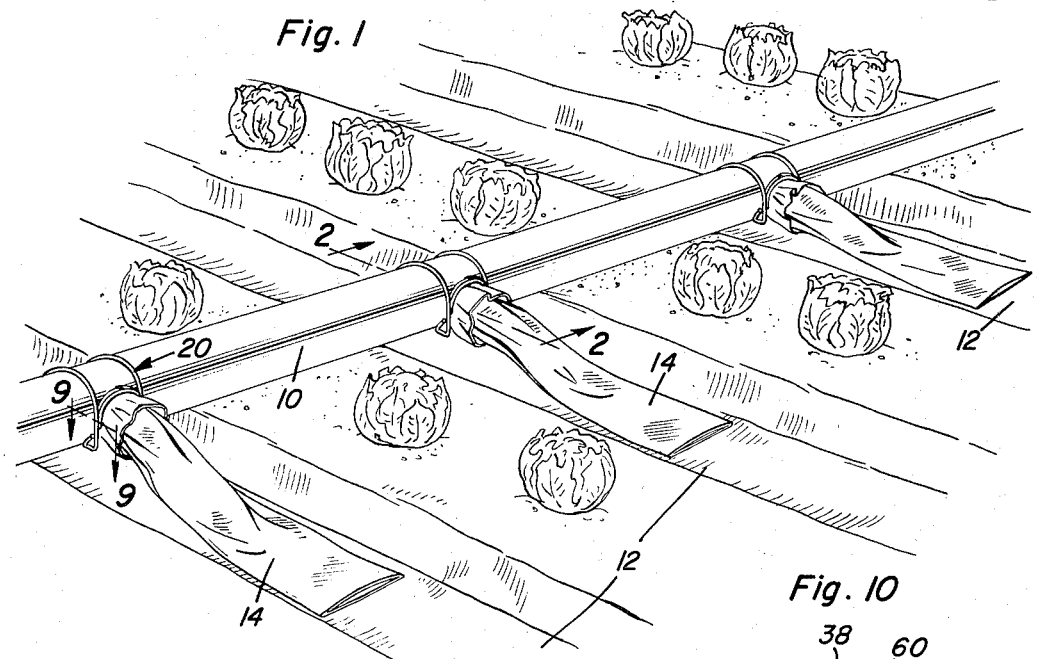
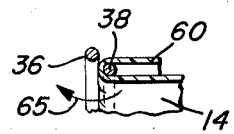
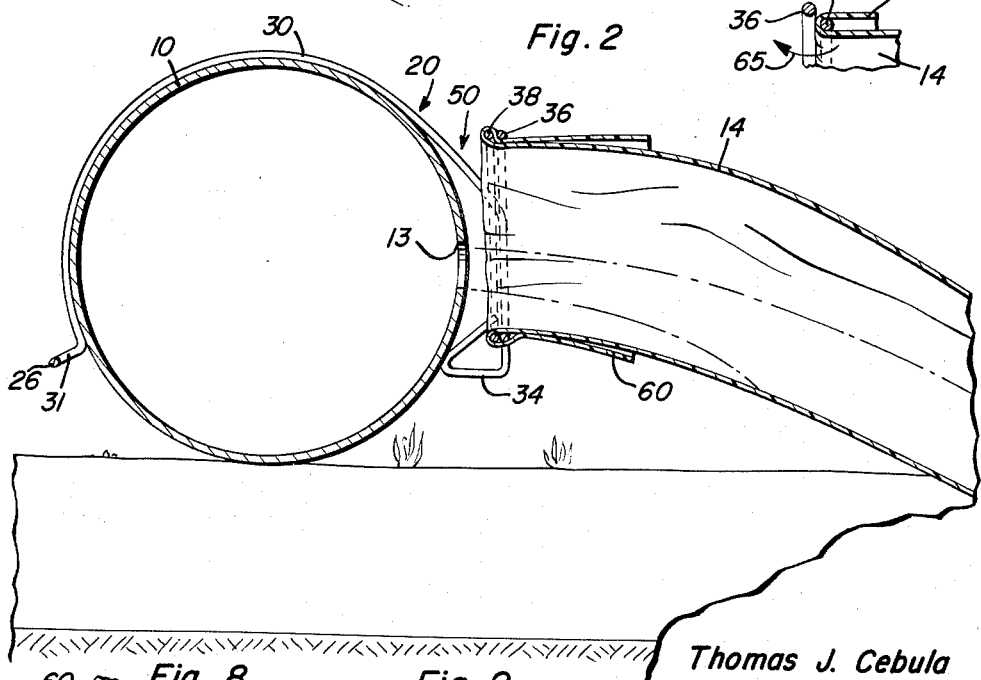
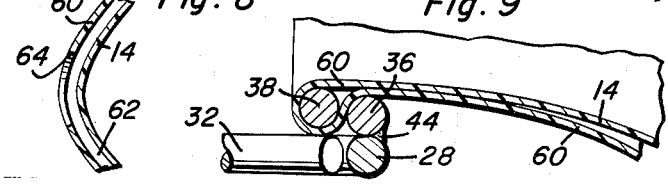
Thomas J. Cebula
INVENTOR.

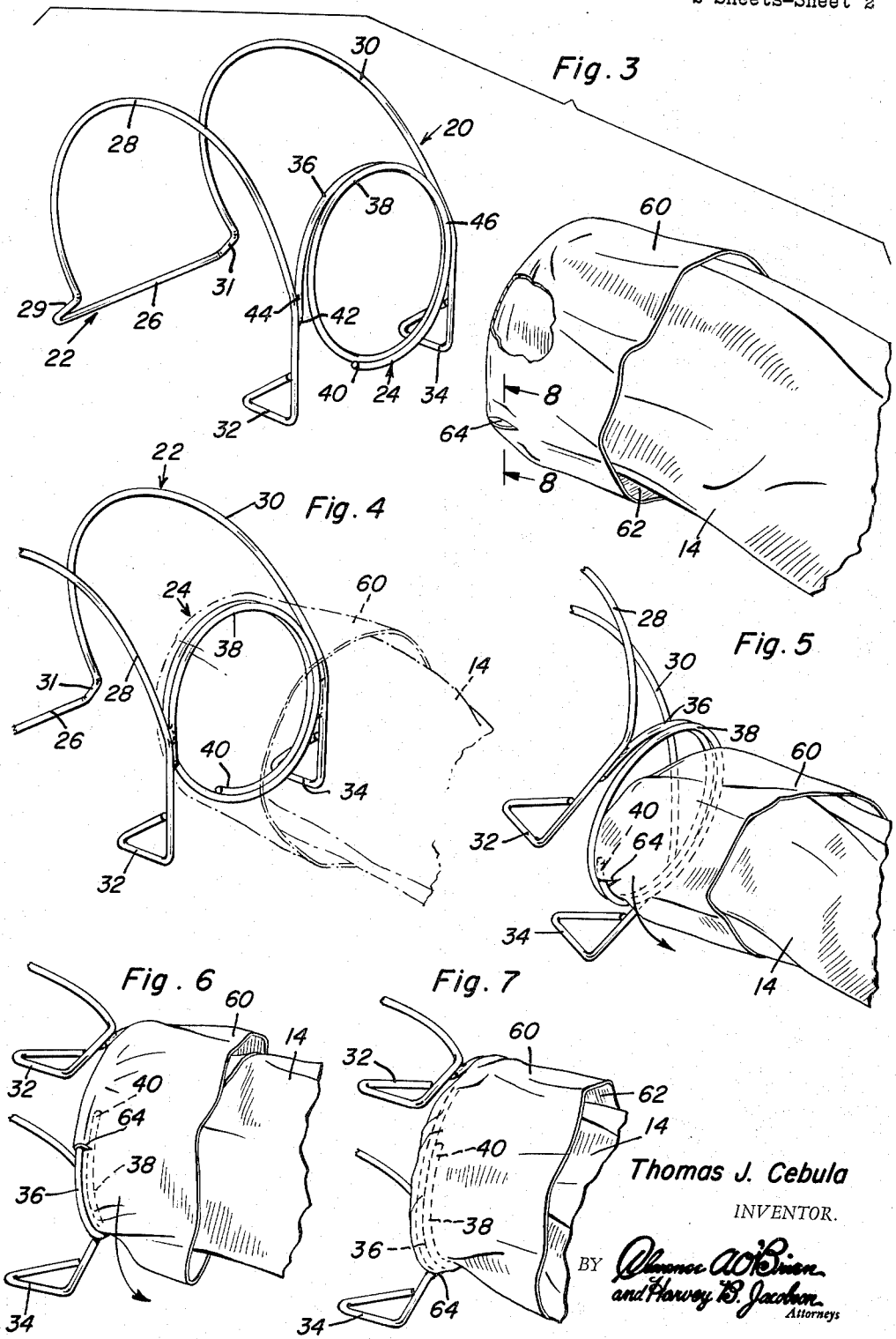

United States Patent Office 3,233,627
Patented Feb. 8, 1966

3,233,627
IRRIGATION HOSE HOLDER
Thomas J. Cebula, R.R. 2, Goodland, Kans.
Filed Oct. 9, 1963, Ser. No. 314,928
15 Claims. (Cl. 137—561)

This invention comprises a novel and useful irrigation hose holder and more particularly pertains to a connector means by which sleeves of pliable material and constituting discharge branch outlet conduits may be removably and adjustably connected to a main irrigation conduit for delivering irrigation water therefrom into selected irrigation ditches.

In irrigation system, it is customary to provide a gated irrigation pipe constituting a main supply of irrigating water and having a series of discharge ports spaced longitudinally thereof and usually with a uniform spacing therebetween, the discharge ports serving as means whereby the irrigating water may be discharged into selected cooperating irrigation ditches or laterals. It is frequently desirable to discharge the irrigation water issued from these discharge ports into irrigation ditches whose spaced relation is such that they do not exactly register with the successive discharge ports of the irrigation pipe. Since the pouring water has a considerable erosive effect upon the soil, this situation gives rise to a difficulty in properly delivering the desired irrigation water to selected irrigation ditches from a main irrigation supply pipe of this nature.

A very important feature of this invention resides in the movability of the attachment and its ease of handling. In a normal irrigating operation, the irregator frequently finds it necessary to handle 120 or more branch outlet conduits or hoses, moving and resetting them with respect to the main irrigation conduit. The construction of the holder of this invention is such that large numbers of the hoses can be carried at one time, as for example, 20 may conveniently be gripped in the palm of a hand while as many as 50 may be simultaneously carried upon one arm. Since the wire-like holder has no protruding or exposed ends, there is eliminated the possibility of puncturing of the pliable material of the hose or tangling of the holder ends when a considerable quantity are being handled at one time. These features greatly reduce the labor required for resetting the branch outlet conduits.

It is therefore the primary purpose of this invention to provide a device which may be readily and removably attached to an irrigation pipe and which will enable the irrigation water discharged from successive or selected discharge ports in the gated irrigation pipe to be effectively lead therefrom and directed into selected irrigation ditches and thereby avoid the previous difficulty encountered from lack of a uniform spacing of the ditches from each other corresponding to the spacing of the discharge ports of the pipe.

A further object of the invention is to provide a discharge conduit assembly of simple and inexpensive construction, and yet which is highly effective for the purposes intended.

A still further object of the invention is to provide a discharge conduit assembly in accordance with the foregoing objects which can be quickly and easily attached to a conventional irrigation pipe and will enable the use of irrigation ditches whose spacing does not correspond exactly to that of the discharge ports of the irrigation pipe.

Still another important object of the invention is to provide a discharge conduit assembly in accordance with the foregoing objects which can be readily attached to or removed from an irrigation pipe at any desired location thereon, and when so attached, will have a stable and secure mounting.

Yet another object of the invention is to provide a discharge conduit assembly in accordance with the previous acceptable objects which will have an improved readily applied or removed engagement with a pliable sleeve constituting a discharge conduit which will serve to securely support and distend the open adit or inlet of the sleeve, maintain the latter in axial alignment with the discharge port of the irrigation pipe and will further enable the sleeve to have its inlet disposed in predetermined spaced relation to the discharge port.

A still further important object of the invention is to provide a means by which a flexible sleeve constituting a discharge conduit may be readily attached to a valved outlet of a main irrigation pipe of the gated valve pipe, and with the inlet end of the sleeve being held opened, reinforced or stiffened and being detachably connected to the main irrigation pipe in an improved manner.

An additional object is to provide a holder for detachably mounting a branch conduit hose upon a main irrigation pipe, which will enable convenient handling and carrying of a large number of holders and without danger of entangling the holders or puncturing the hoses by sharp or protruding ends on the holders.

These together with other objects and advantages which will become subsequently apparent reside in the details of construction and operation as more fully hereinafter described and claimed, reference being made to the accompanying drawings forming a part hereof, wherein like numerals refer to like parts throughout, and in which:

FIGURE 1 is a perspective view illustrating the manner in which the principles of this invention are applied to a conventional form of gated main irrigation supply pipe by which a plurality of irrigation ditches whose spacing may be different from that of the discharge ports of the irrigation pipe, are to be served;

FIGURE 2 is a detailed view taken upon an enlarged scale substantially upon a plane indicated by section line 2—2 of FIGURE 1 and showing the manner in which the sleeve holder of this invention is mounted upon or connected to a port of a main irrigation supply pipe;

FIGURE 3 is a group perspective view of the fastener of FIGURE 2, the sleeve being removed therefrom with parts being broken away;

FIGURE 4 is a perspective view showing the novel holder and with the pliable sleeve being shown in phantom in a position at the beginning of the act of securing the holder to the sleeve;

FIGURE 5 is a view similar to FIGURE 4 but showing the manner in which the fastener element of the holder is partially engaged in a folded end or cuff of the sleeve for distending and supporting the latter;

FIGURE 6 is a view similar to FIGURE 5 but showing the fastener in a still further stage of its attachment to the holder;

FIGURE 7 is a view similar to FIGURE 6 but showing the holder fully attached to the sleeve;

FIGURE 8 is a detailed view taken substantially upon a plane indicated by section line 8—8 of FIGURE 3 showing the sleeve or cuff channel in which the fastener convolution is to be engaged;

FIGURE 9 is an enlarged detailed view taken substantially upon a plant indicated by section line 9—9 of FIGURE 1 and showing in final position the attached engagement of the holder convolutions in the sleeve channel and material; and FIGURE 10 is a detail view similar to FIGURE 9 but showing diagrammatically the manner in which the outer convolution with the sleeve channel engaged thereon is pushed through the inner convolution to effect the locking operation of the sleeve channel to the coil.

Referring first to FIGURE 1, it will be observed that a conventional gated main irrigation supply pipe 10 forming a part of an irrigation system is disposed across a field which contains a plurality of lateral irrigation ditches 12, the spacing between which may be different from the usual uniform spacing of the series of discharge ports such as the ports 13 shown in FIGURE 2 of the main irrigation pipe. Ordinarily, the irrigation ditches 12 are intended to be disposed in the same spaced relation as these discharge ports.

The present invention makes use of a plurality of pliable irrigation hoses or branch discharge conduits or sleeves 14 extending from the discharge ports 13 and into the bottoms of the irrigation ditches 12. Owing to the pliable nature of the sleeves, the same may be disposed at a proper angle to direct a stream of water from a discharge port which is not in registration with an irrigation ditch into the latter upon the bottom wall thereof and in alignment with the axis of the ditch, thereby avoiding the effects of erosion and the like.

The present invention resides primarily in a holder or device by means of which the pliable sleeves 14 may be operatively connected to or mounted upon the main irrigation pipe 10 in proper relation for receiving the irrigation water discharging through the discharge ports 13.

Referring first to FIGURES 2 and 3, it will be observed that the sleeve holder which is indicated by the numeral 20 consists of a mounting or body portion indicated by the numeral 22 and a fastener portion indicated by the numeral 24. The body is generally C-shaped and is of such a size and contour as to snugly, resiliently but releasably embrace the circumference of an irrigation pipe 10 upon both sides of a selected discharge port 13 thereof, throughout a circumferential extent of over one-half of the circumference of this pipe to insure a firm attachment theretor.

In a preferred form of the invention as illustrated the holder 20 is formed with a single piece of spring steel wire. At its mid-portion, the length of wire constitutes a web 26 which is a cross member connecting a pair of parallel C-shaped arms or clips 28 and 30, by angulated arm portions 29 and 31. By means of these arms the web 26 is offset from the pipe 10, as in FIGURE 2, thereby positioning it to form a convenient handle to assist in applying or removing the sleeve holder from the main irrigation pipe 10. Opposite the ends of the arms which are connected by the web or bight 26, the arms are provided with reversely bent loop portions 32 and 34 respectively, extending towards the web 26 and adapted to seat or abut against the irrigation pipe 10. This serves to slightly space the sleeve inlet from the discharge ports 13 as set forth hereinafter.

The fastener 24 constitutes a circular coil consisting of about two convolutions of wire as at 36 and 38. The two ends of the coil wire terminate in these convolutions with one end of the wire as at 40 being free for purposes subsequently set forth, while the other end of the wire as at 42 constitutes the extremity of coil convolution 36 and is welded to the arm 28 as at 44. Diametrically opposite the extremity 42, the holder convolution 36 is welded as at 46 to the loop 30 to thus securely attach the coil to the fastener.

The coil comprising the fastener 24 is of a diameter which corresponds with the pliable sleeve 14 and an important feature of this invention resides in the mounting and spacing of the fastener 24 from the side of the irrigation pipe 10 by means of the arms or loops 32 and 34 in such a manner that the axis of the fastener coil will be aligned with the axis of the discharge ports 13 as shown in FIGURE 2 and the convolutions of the coil will be spaced from the irrigation pipe 10 a sufficient distance to provide a space indicated at 50 therebetween as in FIGURE 2.

It is important at this point to note that the two parallel C-shaped arms 28 and 30 are spaced from each other by approximately the same distance as the diameter of the convolutions of the coil which constitutes the fastener 24. This spacing therefore gives a stable and firm mounting of the device upon the irrigation pipe which tends to prevent twisting of the sleeve holder and which effectively overcomes any lateral or side thrust which may be imparted to the flexible sleeve 14 by the stream of water issuing through the discharge ports 13 as when the sleeve is necessarily bent in order to discharge into an irrigation ditch which is not in direct alignment with the associated discharge port.

The spacing 50 is important in that it enables the attendant to readily determine the rate of flow issuing from the irrigation pipe into the discharge conduit and also enables him to adjust a gate therebetween, not shown, when it is desired to interrupt this flow.

Referring now particularly to FIGURES 2 and 3, it will be observed that the inlet end of the open pliable sleeve 14 is turned outwardly and back upon itself to provide a cuff, layer or flange 60 of material which thus forms a channel or pocket 62 between this material and the body of the sleeve. An opening or slit 64 is provided in the back turned portion adjacent the fold edge of the same and the open or free end 40 of the coil convolution 38 is then threaded into this slit or opening into the pocket 62 by virtue of relative rotation of the sleeve and of the holder convolutions as shown in FIGURES 5–7.

This rotation is continued until one convolution 38 of the holder is inserted through this opening and thus is fully housed within the pocket 62. This position is attained during rotation from the position shown in FIGURE 5 and that of FIGURE 6. A further rotation of the coil relative to the sleeve, from the position of FIGURE 6 to that of FIGURE 7 encloses the portion of the convolution 36 lying between the locations 44 and 46 within the pocket 62, the slit 64 now being disposed adjacent the weld 46. The sleeve 14 is now fully engaged upon the fastener portion 24, with the convolutions 36 and 38 still in the positions shown in FIGURES 3–7. However, the attachment of the sleeve to the holder is rendered even more secure by the following locking engagement.

Continuing from the position shown in FIGURE 7, the resilient convolution 38, with the sleeve cuff 60 secured thereto, is now displaced slightly downwardly from the fixedly mounted convolution 36 and is then forced through the convolution 36 to the other side thereof as indicated by the arrow 65 in FIGURE 10. This results in the position shown in FIGURE 9, in which the completely encased convolution 38 is disposed upon the opposite or inner side of the convolution 36, the latter being partially uncovered as shown in FIGURES 1, 2 and 9. The now outer convolution 36 resiliently and frictionally clamps the cuff 60 against the inner convolution 38 securely locking the sleeve to the coil 20 as shown in FIGURE 9.

Although but two convolutions 36, 38 have been illustrated it is to be understood that additional convolutions could be provided, if desired.

With the device in this position, as shown in FIGURES 7 and 9, the mounting means 22 may readily be engaged upon the main irrigation pipe 10 by using the handle 26. It will be observed that the angulated ends 29 and 31 at one side and the loops 32 and 34 at the other side engage as shown in FIGURE 2 the pipe 10 at portions below its diameter or throughout more than 180° of the circumference of the pipe to thus securely but resiliently attach the mounting to the pipe. Further, the loops 32 and 34 space the inlet of the sleeve at an appropriate distance 50 from the pipe as shown in FIGURE 2 for the purpose previously set forth.

The offset handle 26 produces a number of important advantages for this invention. First, it offers an easily grippable handle, spaced from the irrigation pipe 10 by which the holder and its attached irrigation hose or sleeve can be readily applied to or removed from the pipe 10 or can be adjustably shifted longitudinally thereof.

Further, it offers stability to the opposite ends of the

C-shaped arms 28 and 30 from the coil 24 thereby rigidifying the resilient, wire-like holder.

In addition, it enables a large number of the holders 30, with or without the sleeves 14, to be readily grasped and carried in one hand, facilitating the application to or the removal of the branch conduits from the main irrigation pipe 10 with an important saving of time and labor.

The particular manner of attachment of the sleeves or hoses to the fastener 24 completely avoids the exposure of a sharp end or prong such as 40 since the prong is completely encased in the pocket 62 avoiding any risk of the prong puncturing the thin material of another sleeve or of becoming entangled with other holders when being carried. Further, a readily releasable but extremely secure locked attachment of the sleeve to the holder 20 is effected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sleeve holder for irrigation pipes having longitudinally spaced discharge ports, said holder comprising a mounting portion and a fastener portion respectively engageable with an irrigation pipe and a pliable water impervious sleeve having an adit at one end for receiving water from a discharge port and an exit at its other end for discharging water into an irrigation ditch, said mounting portion comprising a pair of C-shaped arms disposed in parallel relation and spaced for embracing an irrigation pipe on opposite sides of a discharge port, one end of said arms being integrally connected to a transverse member forming a handle by angulated portion of said arms whereby to space the handle from a pipe when the latter is embraced by said arm, the other end of said arms terminating in loops, such arms resiliently embracing said irrigation pipe throughout over half of its circumference and with said loops abutting the side of said pipe, said fastening portion comprising a coil disposed between and fixedly secured to said arms adjacent said loops, said coil comprising about two convolutions of a diameter substantially equal to that of the sleeve adit, said convolutions being partially received within and partially embracing said sleeve adit.

2. The combination of claim 1 wherein said mounting portion and said fastener portion each comprise a single piece of resilient spring wire.

3. The combination of claim 1 wherein said loops space said coil and the sleeve adit fastened thereto from said pipe discharge port.

4. A sleeve holder for irrigation pipes having longitudinally spaced discharge ports, said holder comprising rigidly joined mounting and fastener portions respectively enageable with an irrigation pipe and with a pliable water impervious sleeve having at opposite ends an adit for receiving water from a discharge port and an exhaust for discharging water into an irrigation ditch, said fastener portion comprising a coil including a pair of convolutions of the same diameter as that of said adit, said coil being detachably connected to said adit and stiffening, reinforcing and distending the latter into open position in alignment with said discharge port, said convolutions frictionally clamping a portion of said sleeve adit therebetween and with one convolution being disposed within the adit and the other convolution embracing the adit.

5. The combination of claim 4 wherein said fastener portion comprises a single piece of resilient spring wire wire one end being attached to said mounting portion and having its other end free.

6. In an irrigation system a main irrigation pipe having longitudinally spaced discharge ports and an irrigation sleeve of a pliable and water imperivous material for each port, said sleeve comprising a collapsible open ended tube with an adit and an exhaust, said adit consisting of the end portion of the sleeve being folded outwardly and backwardly of the sleeve and providing a cuff with a channel therebetween, and with a slit in said cuff opening into said channel, a sleeve holder detachably connected to said pipe and to said sleeve adit, said holder including a coil having a pair of convolutions of the same diameter as the sleeve adit, one end of said coil being free and removably inserted through said slit into said adit, one of said convolutions extending through said slit and being received in said channel and the other convolution embracing said sleeve, said convolutions resiliently gripping a portion of said sleeve therebetween.

7. The combination of claim 6 wherein said holder includes a mounting means resiliently embracing said pipe, said coil being fixedly secured to said mounting means and being spaced from said pipe and encircling said outlet port.

8. The combination of claim 7 wherein said holder comprises a body having a pair of parallel C-shaped arms, said arms having a transverse handle integrally joined at one end of said arms and loops integrally formed upon the other ends of said arms, said handle and loops engaging the sides of said pipe and surrounding over half of the circumference of the latter.

9. An irrigation sleeve comprising a pliable water imperivous tube having open inlet and exit, said inlet including a terminal portion of said tube folded backward thereon and constituting a cuff with a pocket between the cuff and tube and with a slit in said cuff, a coil of a resilient wire-like material consisting of a pair of convolutions of the same diameter as said inlet, one convolution extending through said slit and being disposed in said pocket and the other convolution embracing said cuff, said convolutions frictionally and resiliently clamping therebetween a portion of said cuff.

10. The combination of claim 1 wherein said coil comprises a fixed convolution rigidly secured at diametrically opposed portions to said C-shaped arms and a movable convolution carried by said fixed convolution and having a free end, said movable convolution being sufficiently resilient to enable it to be pushed through said fixed convolution to the other side thereof.

11. The combination of claim 4 wherein said mounting portion comprises a pair of C-shaped arms and said coil comprises a fixed convolution rigidly mounted at spaced portions thereof upon said C-shaped arms, said one convolution being movable and carried by said fixed convolution and insertable through the latter whereby the sleeve adit enclosing said one convolution is lockingly clamped between said convolutions.

12. The combination of claim 6 wherein said sleeve holder includes a pair of C-shaped arms and said coil comprises a fixed convolution rigidly mounted at spaced portions thereof upon said C-shaped arms, said one convolution being movable and carried by said fixed convolution and insertable through the latter whereby the sleeve adit enclosing said one convolution is lockingly clamped between said convolutions.

13. A sleeve holder for irrigation pipes having longitudinally spaced discharge ports, said holder comprising a mounting portion and a fastener portion respectively engageable with an irrigation pipe and a pliable water impervious sleeve having an adit at one end for receiving water from a discharge port and an exit at its other end for discharging water into an irrigation ditch, said mounting portion comprising a pair of arms disposed in side-by-side relation and spaced for releasable attachment to an irrigation pipe on opposite sides of a discharge port, one end of said arms terminating in loops, such arms engaging said irrigation pipe throughout over half of its circumference and with said loops abutting the side of said pipe, said fastening portion comprising a coil disposed between and fixedly secured to said arms adjacent said loops, said coil comprising about two convolutions of a resilient wire-like material and of a diameter substantially equal to that of the sleeve adit, said convolutions being partially received within and partially embracing said sleeve adit, said arms and loops supporting said coil in a plane which is generally vertical and perpendicular to the central axis of the associated discharge port and which is spaced from the adjacent side of the irrigation pipe.

14. The combination of claim 13 wherein the adit end portion of said sleeve is folded outwardly and back upon itself and provides a pocket between itself and said sleeve, said coil having one convolution extending through said folded back portion and being received within said pocket, said convolutions having sufficient relative radial resilience whereby one convolution may be passed axially through the other and the sleeve cuff may be resiliently clamped and retained between said coil convolutions.

15. The combination of claim 13 wherein the adit end portion of said sleeve is folded outwardly and back upon itself and provides a pocket between itself and said sleeve, said coil having one convolution extending through said folded back portion and being received within said pocket, the other coil convolution being fixedly attached at circumferentially spaced locations thereon to said arms.

References Cited by the Examiner
UNITED STATES PATENTS

| | | | |
|---|---|---|---|
| 2,940,777 | 6/1960 | Lundberg | 285—5 |
| 3,010,739 | 11/1961 | Boudreau | 251—146 X |
| 3,050,801 | 8/1962 | Downey | 285—5 |

M. CARY NELSON, *Primary Examiner.*

W. CLINE, *Assistant Examiner.*